(12) United States Patent
Noguchi

(10) Patent No.: US 7,581,882 B2
(45) Date of Patent: Sep. 1, 2009

(54) TEMPERATURE SENSOR

(75) Inventor: Mineo Noguchi, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 240 days.

(21) Appl. No.: 11/653,920

(22) Filed: Jan. 17, 2007

(65) Prior Publication Data
US 2007/0171956 A1    Jul. 26, 2007

(30) Foreign Application Priority Data
Jan. 20, 2006  (JP) .............................. 2006-012328

(51) Int. Cl.
*G01K 7/01* (2006.01)
(52) U.S. Cl. ....................... 374/178; 327/539; 702/130
(58) Field of Classification Search ......... 702/130–136, 702/139, 99; 374/170–172, 178; 327/512–513, 327/539, 541
See application file for complete search history.

(56) References Cited

U.S. PATENT DOCUMENTS

| | | | | |
|---|---|---|---|---|
| 4,795,918 A * | 1/1989 | Menon et al. | ................. | 327/539 |
| 5,094,546 A * | 3/1992 | Tsuji | .......................... | 374/178 |
| 5,352,973 A * | 10/1994 | Audy | .......................... | 323/313 |
| 5,961,215 A * | 10/1999 | Lee et al. | ..................... | 374/178 |
| 6,157,244 A * | 12/2000 | Lee et al. | ..................... | 327/539 |
| 6,373,330 B1 * | 4/2002 | Holloway | ..................... | 327/539 |
| 6,529,411 B2 * | 3/2003 | Tonda et al. | ............ | 365/185.18 |
| 6,733,174 B2 * | 5/2004 | Matsumoto et al. | ......... | 374/178 |
| 6,836,160 B2 * | 12/2004 | Li | ............................. | 327/103 |
| 6,876,250 B2 * | 4/2005 | Hsu et al. | .................... | 327/539 |
| 6,975,047 B2 * | 12/2005 | Pippin | ........................ | 307/117 |
| 6,987,416 B2 * | 1/2006 | Ker et al. | ..................... | 327/539 |
| 7,033,072 B2 * | 4/2006 | Aota et al. | ................... | 374/178 |
| 7,057,444 B2 * | 6/2006 | Illegems | ..................... | 327/541 |
| 7,140,767 B2 * | 11/2006 | McLeod et al. | ............. | 374/178 |
| 7,180,211 B2 * | 2/2007 | Sinha et al. | .................. | 307/651 |
| 7,225,099 B1 * | 5/2007 | O'Dwyer | ..................... | 702/130 |
| 7,256,643 B2 * | 8/2007 | Pan et al. | ..................... | 327/539 |
| 7,433,790 B2 * | 10/2008 | Anderson et al. | ............. | 702/85 |
| 2002/0086474 A1 * | 7/2002 | Tonda et al. | ................. | 438/200 |

(Continued)

FOREIGN PATENT DOCUMENTS

JP        05-306958        11/1993

OTHER PUBLICATIONS

Yukihiro Kagenishi, et al., "5-2, Low Power Self Refresh Mode DRAM With Temperature Detecting Circuit", Memory Division, Matsushita Electronics Corp. Nagaokakyo 617, Japan, 1993-5, pp. 43-44.

*Primary Examiner*—Gail Verbitsky
(74) *Attorney, Agent, or Firm*—Studebaker & Brackett PC; Donald R. Studebaker

(57) ABSTRACT

A bandgap reference circuit inputs a reference potential trimming signal therein, generates a reference potential using PN-junction diode characteristics and generates a first temperature-dependent potential dependent on the temperature. A subtraction amplifier circuit inputs the reference potential, the first temperature-dependent potential and a subtracter trimming signal therein and generates a second temperature-dependent potential amplified by subtraction amplification of both a constant bias potential obtained by performing multiplication on the reference potential and the first temperature-dependent potential. An A/D converter inputs the reference potential and the second temperature-dependent potential therein and A/D-converts the second temperature-dependent potential by reference to the reference potential to thereby output temperature decision results.

4 Claims, 7 Drawing Sheets

U.S. PATENT DOCUMENTS

| | | | |
|---|---|---|---|
| 2004/0075487 A1* | 4/2004 | Tesi ............................ | 327/513 |
| 2006/0093016 A1* | 5/2006 | McLeod et al. ............. | 374/178 |
| 2006/0190210 A1* | 8/2006 | Mukherjee .................. | 702/130 |
| 2006/0232326 A1* | 10/2006 | Seitz et al. .................. | 327/539 |
| 2007/0046363 A1* | 3/2007 | Tanzawa ...................... | 327/539 |
| 2007/0164809 A1* | 7/2007 | Fukuda et al. .............. | 327/539 |
| 2007/0268167 A1* | 11/2007 | Ide .............................. | 341/118 |
| 2008/0069176 A1* | 3/2008 | Pertijs et al. ................... | 374/1 |
| 2008/0259990 A1* | 10/2008 | Takeuchi ....................... | 374/1 |

* cited by examiner

TEMPERATURE SENSOR

BACKGROUND OF THE INVENTION

The present invention relates to a temperature sensor capable of determining temperatures on a semiconductor chip with satisfactory accuracy without depending on a variation in source potential, variations in manufacturing process and the like.

As techniques each related to a temperature sensor, there have heretofore been known ones described in, for example, a document patent 1 (Japanese Unexamined Patent Publication No. Hei 5(1993)-306958) and a non-document patent 1 (Symp VLSI Circuits Dig 7 "5-2 Low Power Self Refresh Mode DRAM With Temperature Detecting Circuit" Memory Division, Matsushita Electronics Corp. Nagaokakyo 617, Japan, 1993-5, P. 43-44).

A technique for a temperature detection circuit capable of performing temperature detection independent on a manufacturing process, using a bandgap circuit has been described in the patent document 1.

A technique for a temperature sensor mounted to a dynamic random access memory (hereinafter called "DRAM") has been described in the non-patent document 1. In order to reduce a self-refresh current in the DRAM, for example, each temperature in a semiconductor chip is detected by the temperature sensor, and a refresh frequency is lowered at a low temperature and raised at a high temperature.

FIG. 6 is a block diagram showing a temperature sensor equipped with the conventional DRAM described in the non-patent document 1.

The DRAM shown in FIG. 6 has different types of devices (for example, a temperature sensor 10-1 for 70° C., a temperature sensor 10-2 for 45° C. and a temperature sensor 10-3 for 15° C.) different in temperature characteristic, for detecting temperatures in a semiconductor chip. A refresh timer selection circuit 20 is connected to output terminals of these devices. The refresh timer selection circuit 20 is a circuit that selects time-measuring timers 21 through 24 corresponding to the respective temperature sensors 10-1 through 10-3, based on temperature detection results of the temperature sensors 10-1 through 10-3. The timer 21 is a timer short in measurement time when a semiconductor chip temperature Ta is higher than 70° C. (Ta>70° C.). The timer 22 is a timer rather short in measurement time when 70° C.>Ta>45° C. The timer 23 is a timer rather long in measurement time when 45° C.>Ta>15° C. The timer 24 is a timer long in measurement time when Ta<15° C. Any one of the timers 21 through 24 is selected by the refresh timer selection circuit 20. A refresh operation of each DRAM memory cell is performed by a self-refresh controller 25 at measurement time intervals of the selected timer.

Since the time taken up to the disappearance of an electric charge stored in the DRAM memory cell is short when the temperature in the semiconductor chip is high, a refresh time interval is set short (i.e., a refresh frequency is raised). Since the time taken up to the disappearance of the electric charge is long when the temperature is low, the refresh time interval is set long (i.e., the refresh frequency is lowered) and a self-refresh current is hence reduced.

The temperature sensor 10-1 for 70° C. comprises an N well resistor 11-1 and polysilicon resistors 11-2 through 11-4 lying in a semiconductor substrate, temperature sensor activating N channel type MOS transistors (hereinafter called "NMOSs") 12-1 and 12-2 on/off-operated by a control signal DTC, a P-type sense amplifier 13 constituted of P channel type MOS transistors (hereinafter called "PMOSs") 13-1 and 13-2 that amplify a difference in potential between a node A placed between the N well resistor 11-1 and the polysilicon resistor 11-2 and a node B located between the polysilicon resistors 11-3 and 11-4, an N-type sense amplifier 14 constituted of NMOSs 14-1 and 14-2 that amplify the potential difference between the nodes A and B, P-type sense amplifier activating PMOSs 15-1 and 15-2 on/off-operated by a control signal SEP, and N-type sense amplifier activating NMOSs 16-1 and 16-2 on/off-operated by a control signal SEN.

Other temperature sensors 10-2 and 10-3 for 45° C. and 15° C. are also simply different in temperature vs. voltage characteristic and respectively configured by a similar circuit.

FIG. 7 is a diagram showing a timing chart for describing the control signals shown in FIG. 6. The horizontal axis indicates the time and the vertical axis indicates a logical level ("H" or "L" level). FIG. 8 is a potential relational diagram of temperature vs. nodes A and B, which is indicative of potential states based on temperature transitions at the nodes A and B. The horizontal axis indicates the temperature [° C.] and the vertical axis indicates the voltage [V].

The operation of the temperature sensor 10-1 will be described for instance. When the control signal DTC is brought to an "H" level, the NMOSs 12-1 and 12-2 are respectively brought to an on state, so that source currents flow through the resistors 11-1 and 11-2 and the resistors 11-3 and 11-4 respectively series-connected between the source potential VDD and ground GND. Next, the control signal SEN is brought to an "H" level so that the NMOSs 16-1 and 16-2 are respectively placed in an on state, thereby activating the N-type sense amplifier 14. Subsequently, the control signal SEP is brought to an "L" level so that the PMOSs 15-1 and 15-2 are respectively placed in an on state to activate the P-type sense amplifier 13. In doing so, a difference in potential occurs between the nodes A and B due to the voltage division of the resistors 11-1 through 11-4 different in temperature vs. resistance value. This is amplified by the sense amplifiers 13 and 14, after which a detection voltage corresponding to a detected temperature is outputted and sent to the refresh timer selection circuit 20. Other temperature sensors 10-2 and 10-3 are also operated in like manner and detection voltages corresponding to detected temperatures are outputted and sent to the refresh timer selection circuit 20.

The refresh timer selection circuit 20 compares detection voltages sent from the temperature sensors 10-1 through 10-3 and logically determines whether the temperature chip temperature Ta belongs to a temperature range of any of Ta>70° C., 70° C.>Ta>45° C., 45° C.>Ta>15° C. and Ta<15° C., thereby selecting the corresponding one timer (one of the timers 21 through 24). On the basis of the above result of selection, a refresh operation relative to each DRAM memory cell is performed at set time intervals of the selected timer under the control of the cell refresh controller 25.

The conventional circuit such as shown in FIG. 6, however, determines the semiconductor chip temperature Ta from the potential states based on the temperature transitions of the nodes A and B, which are generated due to a temperature gradient difference between the plural temperature sensors 10-1 through 10-3 corresponding to the different types of devices different in temperature characteristic. Therefore, the design of margins is difficult when the cumbersomeness for fabrication of the plural temperature sensors 10-1 through 10-3 and variations in characteristic are taken into consideration. It was thus difficult to reduce variations in manufacturing process and enhance the accuracy of temperature decisions.

SUMMARY OF THE INVENTION

The present invention has been made to solve such conventional problem. It is an object of the present invention to provide a temperature sensor which reduces variations in manufacturing process and enhances the accuracy of temperature decisions.

According to one aspect of the present invention, for attaining the above object, there is provided a temperature sensor comprising a bandgap reference circuit that generates a reference potential using PN-junction diode characteristics and generates a first temperature-dependent potential dependent on the temperature, a subtraction amplifier circuit that inputs the reference potential and the first temperature-dependent potential therein and generates a second temperature-dependent potential amplified by subtraction amplification of both a constant bias potential obtained by performing multiplication on the reference potential and the first temperature-dependent potential, and an analog/digital converter (hereinafter called "A/D") that inputs the reference potential and the second temperature-dependent potential therein and analog/digital-converts the second temperature-dependent potential by reference to the reference potential to thereby output temperature decision results.

According to another aspect of the present invention, for attaining the above object, there is provided another temperature sensor which is provided, as an alternative to the subtraction amplifier circuit, with a function generator that inputs the reference potential and the first temperature-dependent potential therein and generates a second temperature-dependent potential of a predetermined function with respect to the first temperature-dependent potential, based on the reference potential.

According to the temperature sensor of the present invention, temperature decision results outputted from an A/D converter are almost independent on the voltage and the manufacturing process. Thus, high-accuracy and stable temperature decisions are enabled. According to another temperature sensor of the present invention, temperature decision results based on arbitrary functions can be obtained.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

A temperature sensor includes a bandgap reference circuit, a subtraction amplifier circuit and an A/D converter. The bandgap reference circuit generates a reference potential using PN-junction diode characteristics and generates a first temperature-dependent potential dependent on the temperature. The subtraction amplifier circuit inputs the reference potential and the first temperature-dependent potential therein and generates a second temperature-dependent potential amplified by subtraction amplification of both a constant bias potential obtained by performing multiplication on the reference potential and the first temperature-dependent potential. The A/D converter inputs the reference potential and the second temperature-dependent potential therein and A/D-converts the second temperature-dependent potential by reference to the reference potential to thereby output temperature decision results.

Preferred embodiments of the present invention will hereinafter be described with reference to the accompanying drawings.

First Preferred Embodiment

Configuration of First Embodiment

Figure 1:
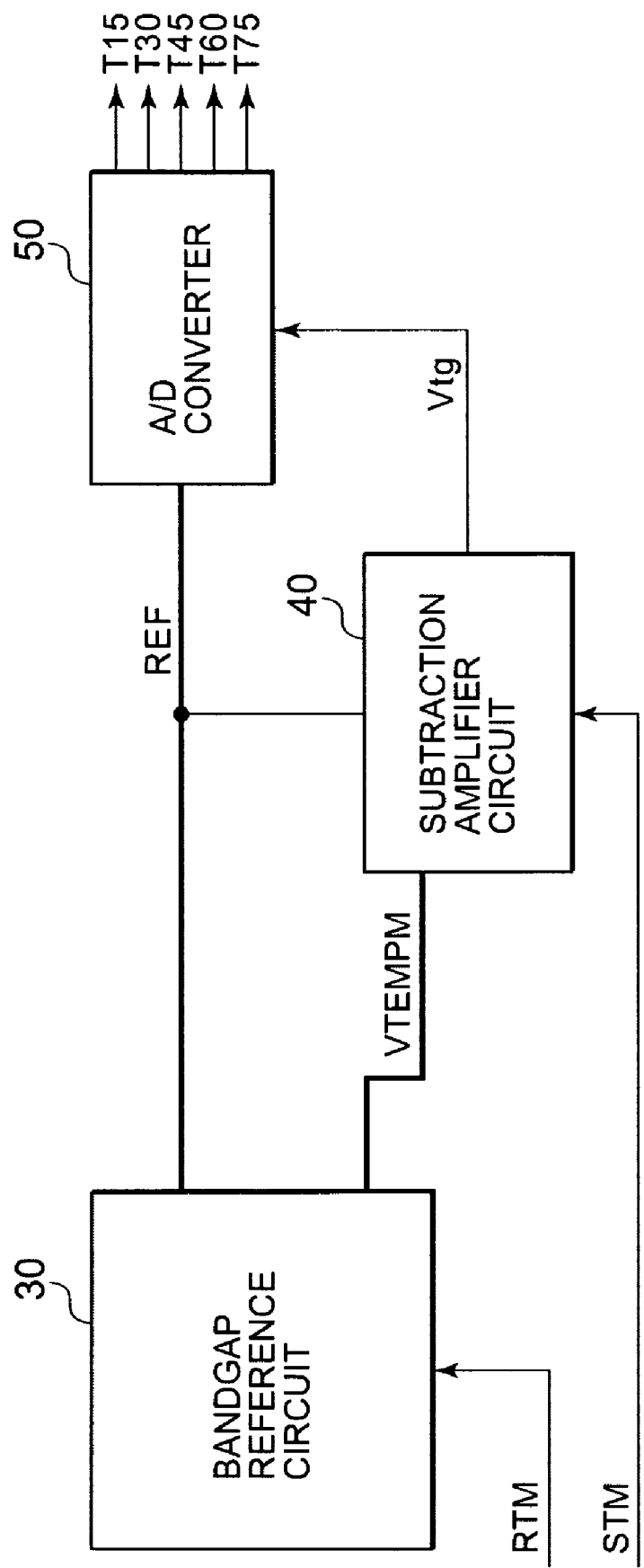
FIG. 1 is a block diagram of a temperature sensor showing a first embodiment of the present invention.

FIG. 1 is a block diagram of a temperature sensor showing a first embodiment of the present invention.

The temperature sensor according to the first embodiment includes a bandgap reference circuit 30 which inputs a reference potential trimming signal RTM therein and which generates a reference potential REF using PN-junction diode characteristics and generates a first temperature-dependent potential VTEMPM dependent on the temperature, a subtraction amplifier circuit 40 which inputs the reference potential REF, the first temperature-dependent potential VTEMPM and a subtracter trimming signal STM therein and generates a second temperature-dependent potential Vtg amplified by effecting subtraction amplification on both a constant bias potential obtained by performing multiplication on the reference potential REF and the first temperature-dependent potential VTEMPM, and an A/D converter 50 which inputs the reference potential REF and the second temperature-dependent potential Vtg therein and A/D-converts the second temperature-dependent potential Vtg by reference to the reference potential REF to thereby output temperature decision results T15, T30, T45, T60 and T75. The present temperature sensor is manufactured using a simple bipolar transistor manufacturing process on a complementary MOS transistor (CMOS) manufacturing process, for example.

Figure 2:
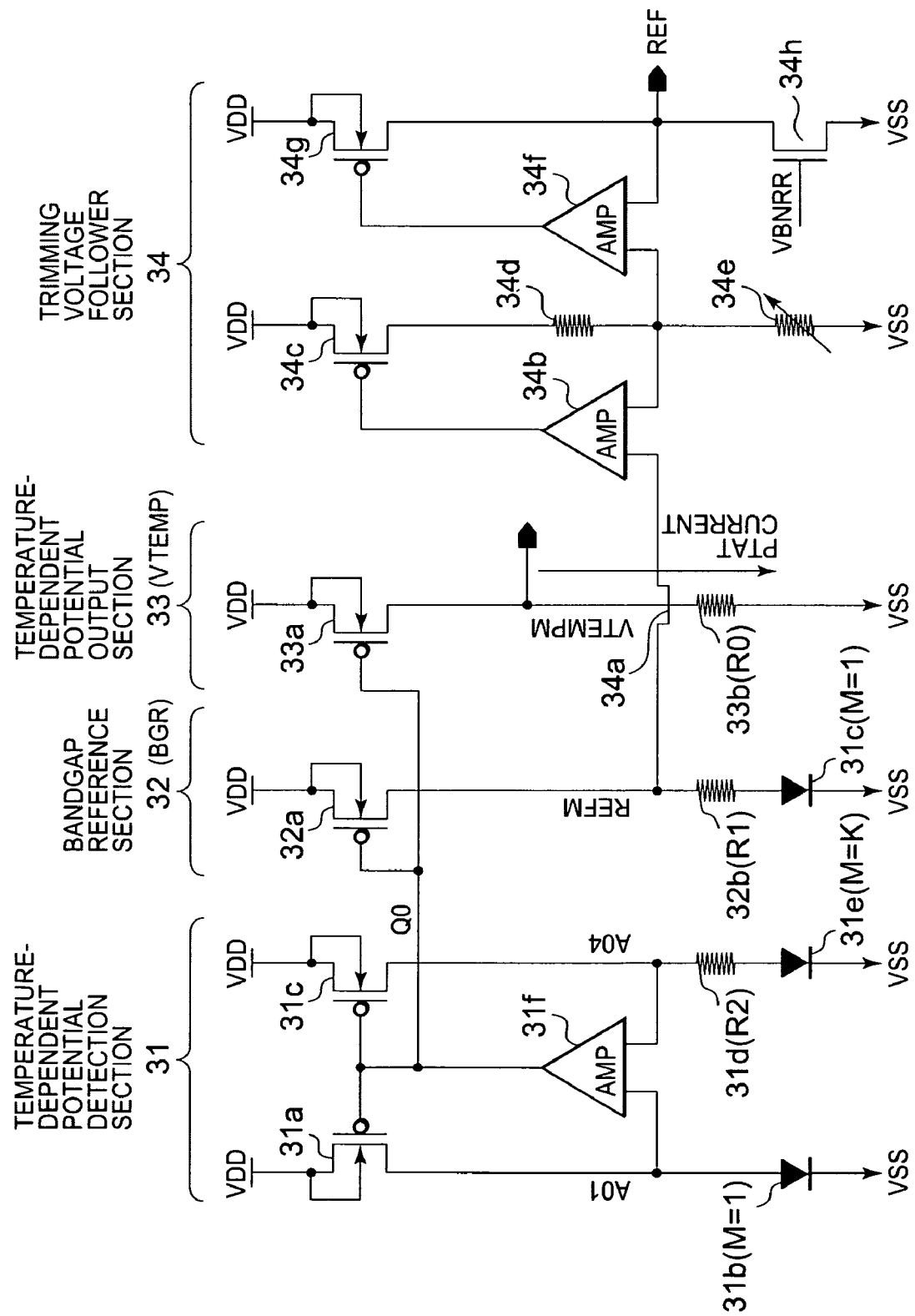
FIG. 2 is a circuit diagram of a bandgap reference circuit shown in FIG. 1.

FIG. 2 is a circuit diagram showing a configuration example of the bandgap reference circuit 30 shown in FIG. 1.

The bandgap reference circuit 30 comprises a temperature-dependent potential detection section (PTAT) 31 which detects a first potential Q0 dependent on the temperature, a bandgap reference section (BGR) 32 which generates a reference potential REFM corresponding to a second potential, a temperature-dependent potential output section (VTEMP) 33 which outputs a temperature-dependent potential VTEMPM dependent on the temperature, and a trimming voltage follower section 34 which outputs the reference potential REF adjusted based on the reference potential trimming signal RTM.

The temperature-dependent potential detection section 31 comprises a current mirror driver PMOS 31a and a PN-junction diode 31b having a diode area ratio M=1 both connected in series between a power supply or source potential VDD and a ground potential VSS, a current mirror driver PMOS 31c, a resistor 31d having a resistance value R2 and a PN-junction diode 31e having a diode area ratio M=K, which are connected in series between the source potential VDD and the ground potential VSS, and an amplifier (hereinafter called "Amp") 31f. A node having a potential A01, which is located between the current mirror driver PMOS 31a and the diode 31b, is connected to a first input terminal of the Amp 31f. A node having a potential A04, which is disposed between the current mirror driver PMOS 31c and the resistor 31d, is connected to a second input terminal of the Amp 31f. An output terminal of the Amp 31f is commonly connected to the gates of the current mirror driver PMOSs 31a and 31c. The Amp 31f is a circuit which differential-amplifies the potential A01 and the potential A04 thereby to control gate potentials of the PMOSs 31a and 31c. A potential Q0 dependent on the temperature is outputted from the output terminal of the Amp 31f.

The bandgap reference section 32 comprises a current mirror driver PMOS 32a, a resistor 32b having a resistance value R1 and a PN-junction diode 32c having a diode area ratio M=1, which are connected in series between the source potential VDD and the ground potential VSS. In the current mirror driver PMOS 32a, a gate potential thereof is controlled by the potential Q0 dependent on the temperature so that the corresponding reference potential REFM is outputted from a node between the current mirror driver PMOS 32a and the resistor 32b.

The temperature-dependent potential output section 33 comprises a current mirror driver PMOS 33a and a resistor 33b having a resistance value R0, which are connected in series between the source potential VDD and the ground potential VSS. The current mirror driver PMOS 33a constitutes a current mirror circuit along with the current mirror driver PMOSs 31a, 31c and 32a. In the current mirror driver PMOS 33a, a gate potential thereof is controlled by the potential Q0 dependent on the temperature so that a temperature-dependent current PTAT flows. Thus, a temperature-dependent potential VTEMPM dependent on the temperature is outputted from a node provided between the current mirror driver PMOS 33a and the resistor 33b.

The trimming voltage follower section 34 comprises an NMOS 34a whose gate potential is controlled by the temperature-dependent potential VTEMPM to input the reference potential REFM, an Amp 34b which differential-amplifies the inputted reference potential REFM and a PMOS drain potential, a PMOS 34c, a resistor 34d and a variable resistor 34e whose resistance value changes according to the reference potential trimming signal RTM, which are connected in series between the source potential VDD and the ground potential VSS, an Amp 34f which differential-amplifies a potential developed between the resistor 34d and the variable resistor 34e and the reference potential REF, and a PMOS 34g and an NMOS 34h both connected in series between the source potential VDD and the ground potential VSS.

The Amp 34b differential-amplifies the reference potential VTEMPM inputted from the NMOS 34a and a drain potential of the PMOS 34c to control a gate potential of the PMOS 34c. The Amp 34f differential-amplifies the potential developed between the resistor 34d and the variable resistor 34e and a drain potential of the PMOS 34g to control a gate potential of the PMOS 34g. The corresponding reference potential REF is outputted from the drain of the PMOS 34g. The NMOS 34h is a transistor that turns on/off between the drain of the PMOS 34g and the ground potential VSS in accordance with a control signal VBNRR.

Figure 3:
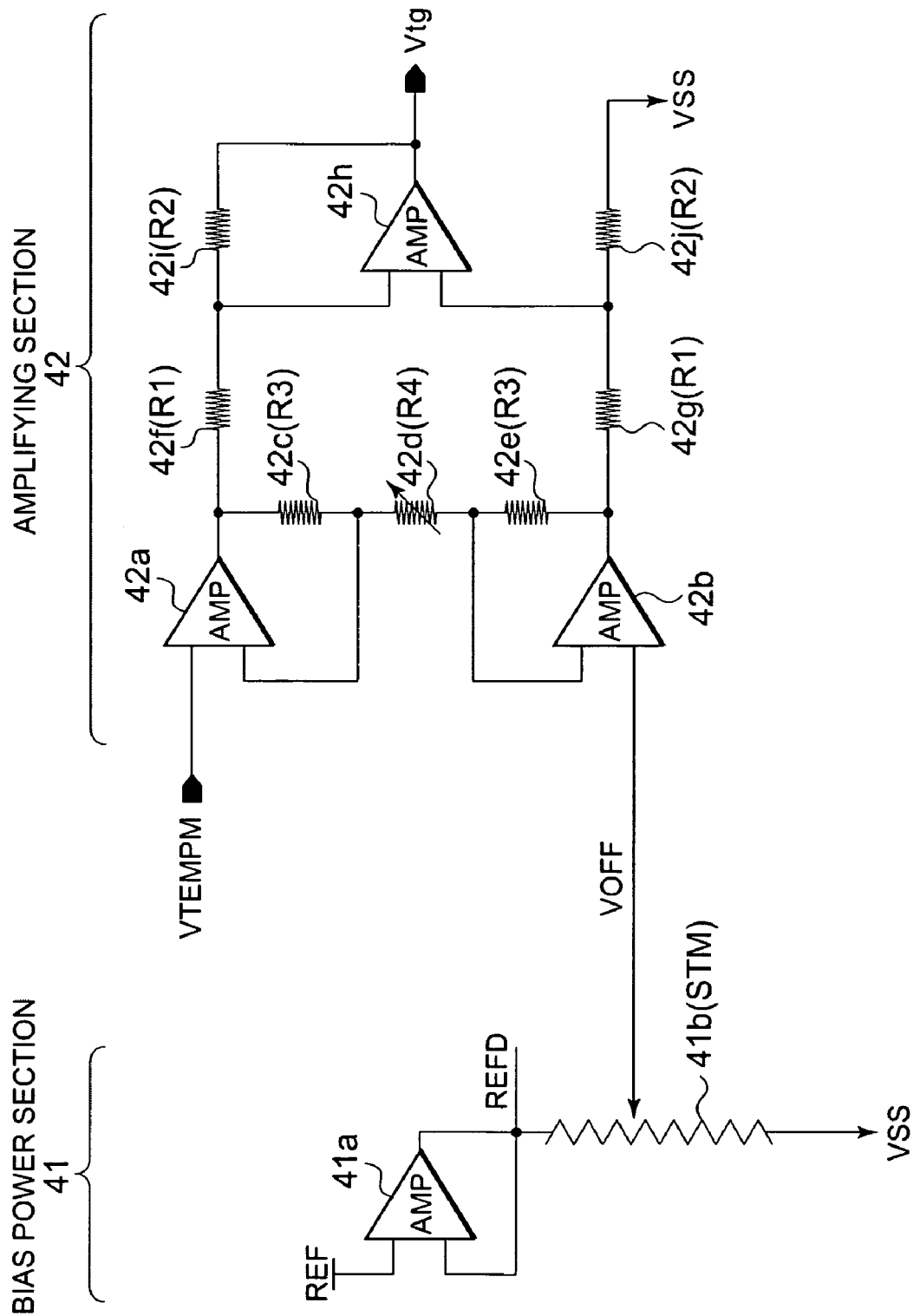
FIG. 3 is a circuit diagram of a subtraction amplifier circuit shown in FIG. 1.

FIG. 3 is a circuit diagram showing a configuration example of the subtraction amplifier circuit 40 shown in FIG. 1.

The subtraction amplifier 40 comprises a bias power section 41 which generates a bias potential VOFF divided based on the reference potential REF, and an amplifying section 42 constituted of both an instrumentation operational amplifier circuit which effects subtraction amplification on the first temperature-dependent potential VTEMPM and the bias potential VOFF to generate a second temperature-dependent potential Vtg, and a trimming circuit which controls the gain of the instrumentation operational amplifier circuit.

The bias power section 41 comprises an Amp 41a which generates a potential REFD approximately equal to the reference potential REF, and a division resistor 41b which is connected between an output terminal of the Amp 41a and the ground potential VSS and generates a divided bias potential VOFF. The division resistor 41b changes in resistance value according to the subtractor trimming signal STM.

The amplifying section 42 comprises an Amp 42a having a first input terminal to which the first temperature-dependent potential VTEMPM is inputted, an Amp 42b having a first input terminal to which the bias potential VOFF is inputted, a resistor 42c having a resistance value R3, which is connected between an output terminal of the Amp 42a and a second input terminal thereof, a resistor 42e having a resistance value R3, which is connected between an output terminal of the Amp 42b and a second input terminal thereof, a gain adjustment variable resistor 42d having a resistance value R4, which is connected between the resistors 42c and 42e, a resistor 42f having a resistance value R1, which is connected to the output terminal of the Amp 42a, a resistor 42g having a resistance value R1, which is connected to the output terminal of the Amp 42b, an Amp 42h which differential-amplifies an output potential of the resistor 42f, which is inputted to a first input terminal thereof, and an output potential of the resistor 42g, which is inputted to a second input terminal thereof, thereby to output a second temperature-dependent potential Vtg from an output terminal thereof, a resistor 42i having a resistance value R2, which is connected between the first input terminal of the Amp 42h and the output terminal thereof, and a resistor 42j having a resistance value R2, which is connected between the second input terminal of the Amp 42h and the ground potential VSS.

Figure 4:
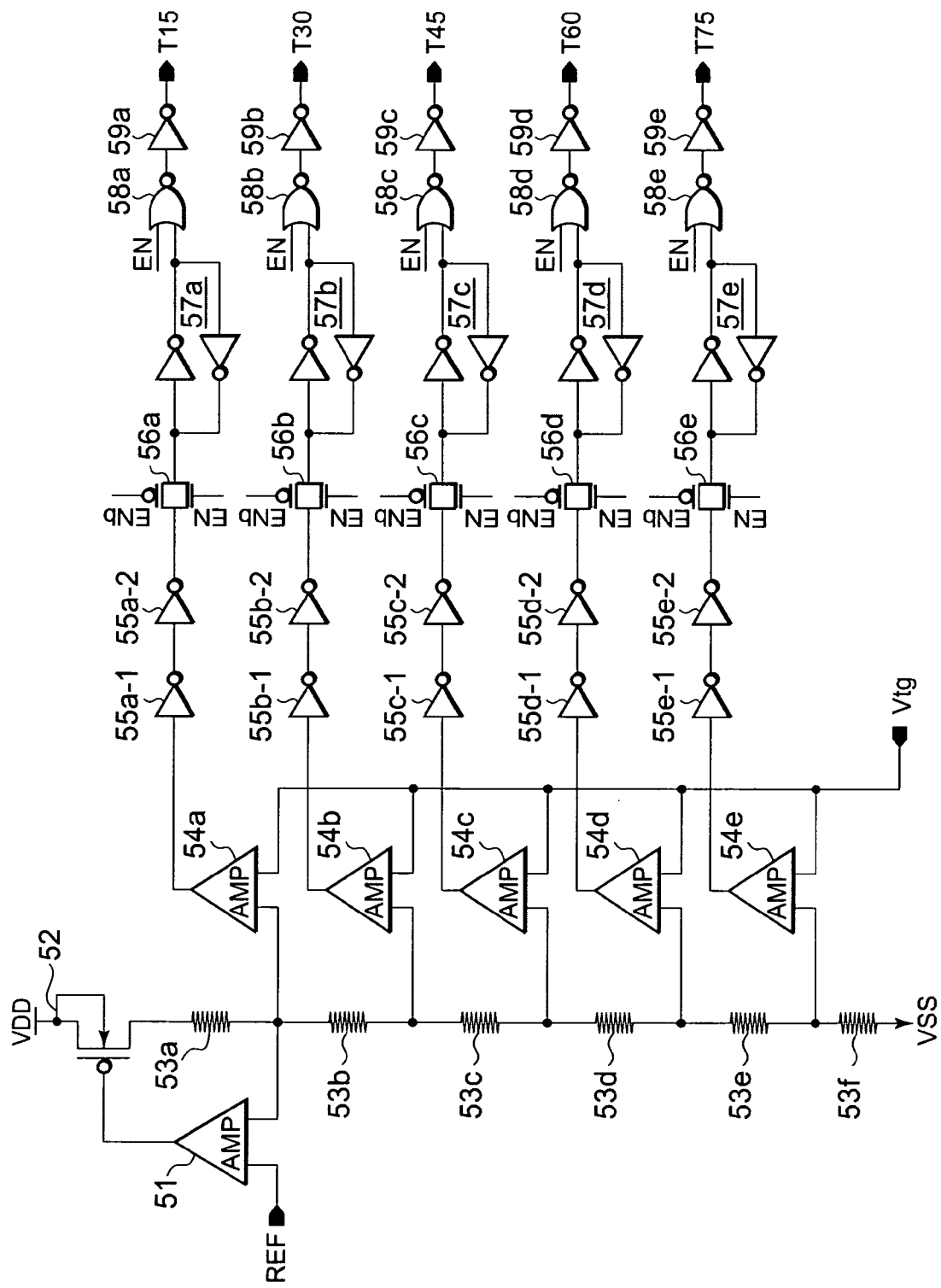
FIG. 4 is a circuit diagram of an A/D converter shown in FIG. 1.

FIG. 4 is a circuit diagram showing a configuration example of the A/D converter 50 shown in FIG. 1.

The A/D converter 50 comprises an Amp 51 which differential-amplifies the reference potential REF inputted from its first input terminal and a division potential inputted from its second input terminal, a PMOS 52 of which the source is connected to the source potential VDD and whose gate potential is controlled by the output of the Amp 51, a resistor 53a connected between the drain of the PMOS 52 and the second input terminal of the Amp 51, division resistors 53b through 53f series-connected between the resistor 53a and the ground potential VSS, Amps 54a through 54e which respectively compare respective division potentials and the second temperature-dependent potential Vtg, respective two-stage inverters 55a-1 and 55a-2 through 55e-1 and 55e-2 which respectively convert output potentials of the Amps 54a through 54e into a logical "1" or "0", analog switches 56a through 56e constituted of PMOS and NMOS, each of which turns on/off output logic of each of the inverters 55a-2 through 55e-2 in accordance with an enable signal EN and an inversion enable signal ENb, latch circuits 57*a* through 57*e* respectively constituted of two inverters connected in inverse parallel, each of which latches output logic of each of the analog switches 56*a* through 56*e*, two-input negative OR gates (hereinafter called "NOR gate") 58*a* through 58*e* which respectively determine NORing of the output logics of the latch circuits 57*a* through 57*e* and the enable signal EN, and inverters 59*a* through 59*e* which respectively drive the output logics of the respective NOR gates 58*a* through 58*e* thereby to output temperature decision results T15, T30, T45, T60 and T75 each indicative of the logical "1" or "0".

Operation of First Embodiment

In the temperature-dependent potential detection section 31 lying in the bandgap reference circuit 30, electric characteristics kT/q (where k: Boltzmann constant, T: temperature, and q: elementary electric charge) of the diodes 31*b* and 31*d* change according to a change in temperature. Thus, the potential A01 between the PMOS 31*a* and the diode 31*b* and the potential A04 between the PMOS 31*c* and the resistor 31*d* are differential-amplified by the Amp 31*f*. The gate potential of the PMOS 32*a* lying in the bandgap reference section 32 and the gate potential of the PMOS 33*a* lying in the temperature-dependent potential output section 33 are controlled by the amplified potential Q0, so that a source current flows through the PMOS 32*a*, resistor 32*b* and diode 32*c* lying in the bandgap reference section 32 and a source current flows through the PMOS 33*a* and resistor 33*b* lying in the temperature-dependent potential output section 33. Thus, the corresponding reference potential REFM appears between the PMOS 32*a* and the resistor 32*b*, and the corresponding temperature-dependent potential VTEMPM dependent on the temperature appears between the PMOS 33*a* and the resistor 33*b*.

The potential VTEMPM is theoretically expressed as follows:

$$VTEMPM = \frac{kT}{q} \frac{R0}{R2} \ln K \quad (1)$$

where k: Boltzmann constant,
T: temperature,
q: elementary electric charge,
R0 and R2: resistance values, and
K: diode area ratio Since the above equation is determined by a dimensional ratio and physical constants, there are no dependence on the voltage and influence of variations in manufacturing process. The temperature-dependent potential VTEMPM is supplied to the subtraction amplifier circuit 40. On the other hand, the reference potential REFM is theoretically expressed as follows:

$$REFM = \frac{k}{q}\left(T \cdot \ln\frac{1}{T^3} - T \cdot \ln A + \frac{Eg}{k}\right) + \frac{kT}{q} + \frac{R1}{R2}\ln K \quad (2)$$

(negative temperature coefficient)

(positive temperature coefficient)

where Eg: bandgap of silicon
A: executed density of state
R1: resistance value Although a variation in voltage due to manufacturing process parameters and a variation in current occurs, it is of a level having no effect on the operation. The reference potential REFM is trimmed to a predetermined potential by the variable resistor 34*e* of the trimming voltage follower section 34, which results in REF=a×REFM. This is outputted from between the drain of the PMOS 34*g* and the source of the NMOS 34*h* and supplied to the subtraction amplifier circuit 40 and the A/D converter 50.

In the subtraction amplifier circuit 40, the bias power section 41 generates a potential REFD approximately similar to the reference potential REF through the Amp 41*a*. The potential REFD is divided by the division resistor 41*b* whose resistance value is changed by the subtraction trimming signal STM to generate a bias potential VOFF=b×REFD. The bias potential VOFF is subtracted from the first temperature-dependent potential VTEMPM by the amplifying section 42. The so-subtracted value is amplified at gain α to generate the following second temperature-dependent potential Vtg, which in turn is outputted to the A/D converter 50.

$$Vtg = \alpha(VTEMPM - VOFF) \quad (3)$$

$$\alpha = \frac{R2}{R1}\left(1 + 2 \times \frac{R4}{R3}\right)$$

In the A/D converter 50, the reference potential REF is divided by the division resistors 53*b* through 53*f* set to a division ratio c, via the PMOS 52 and the resistor 53*a*. The so-divided respective potentials c×REF are compared with the temperature-dependent potential Vtg by the respective Amps 54*a* through 54*e* respectively. When, for example, the division potential c×REF developed between the resistors 53*e* and 53*f* is equivalent to 75° C. and the temperature-dependent potential Vtg is placed in the following relation:

$$c \times REF < Vtg \quad (4)$$

the output logic of the inverters 55*e*-1 and 55*e*-2 connected to the output terminal of the Amp 54*e* becomes "1", and the respective output logics of the inverters 55*a*-1 and 55*a*-2 through 55*d*-1 and 55*d*-2 respectively connected to the output terminals of the other Amps 54*a* through 54*d* become "0". When the enable signal EN becomes "1" and the inversion enable signal ENb becomes "0", and the analog switches 56*a* through 56*e* are respectively brought to an on state and the NOR gates 58*a* through 58*e* are closed, the output logics "0" of the respective inverters 55*a*-2 through 55*d*-2 are latched into their corresponding latch circuits 57*a* through 57*d*. Further, the output logic "1" of the inverter 55*e*-2 is latched into its corresponding latch circuit 57*e*. Thereafter, when the enable signal EN is brought to "0" and the respective NOR gates 58*a* through 58*e* are opened, the temperature decision results T15, T30, T45 and T60 outputted from the inverters 59*a* through 59*d* are brought to "0" and the temperature decision result T75 outputted from the inverter 59*e* reaches "1". Thus, it is judged that a chip temperature has exceeded 75° C.

Advantageous Effects of First Embodiment

It is understood from the equations (1) through (3) that the equation (4) indicative of the temperature decision results T15, T30, T45, T60 and T75 outputted from the A/D converter 50 is almost independent on the voltage and the manufacturing process. Thus, high-accuracy and stable temperature decisions are enabled.

Second Preferred Embodiment

Figure 5:
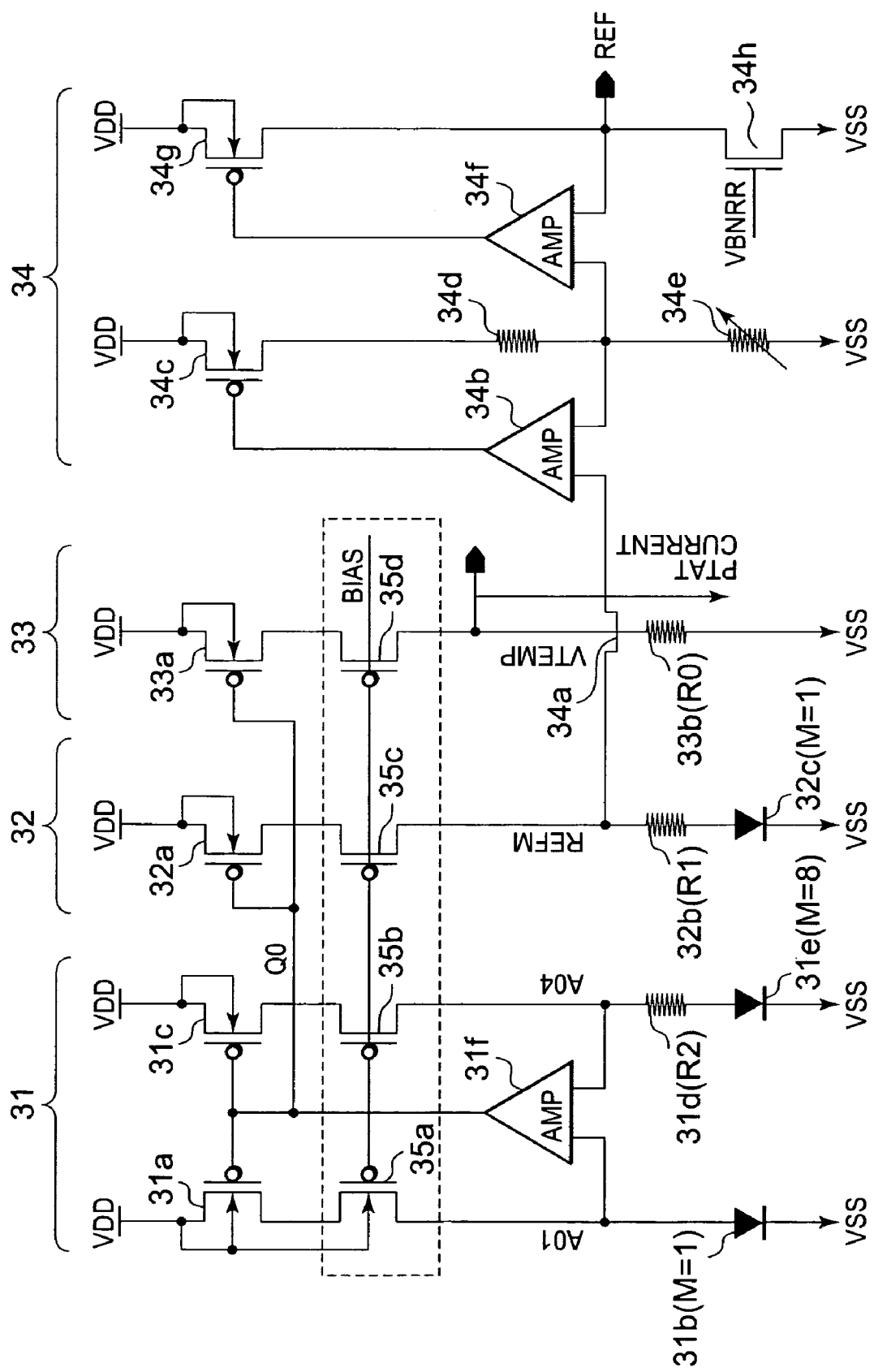
FIG. 5 is a circuit diagram of a bandgap reference circuit showing a second embodiment of the present invention.
Figure 6:
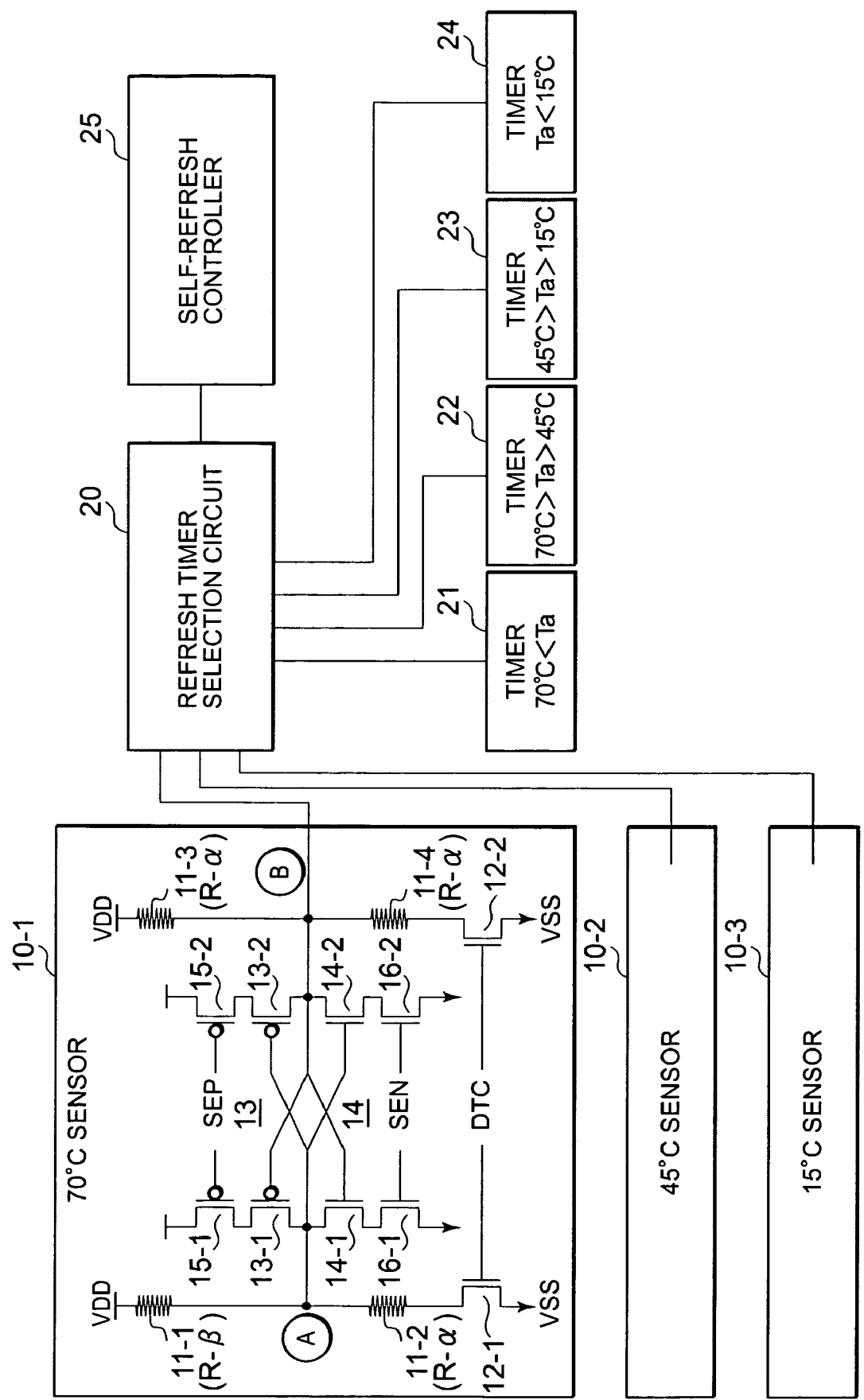
FIG. 6 is a block diagram of a conventional temperature sensor.
Figure 7:
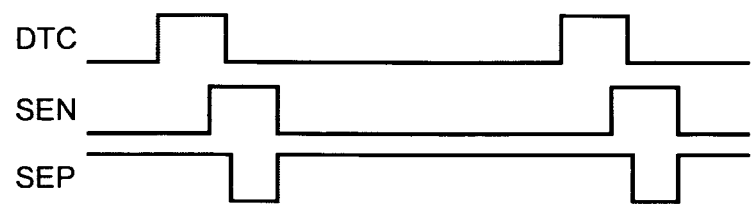
FIG. 7 is a timing chart for describing control signals.
Figure 8:
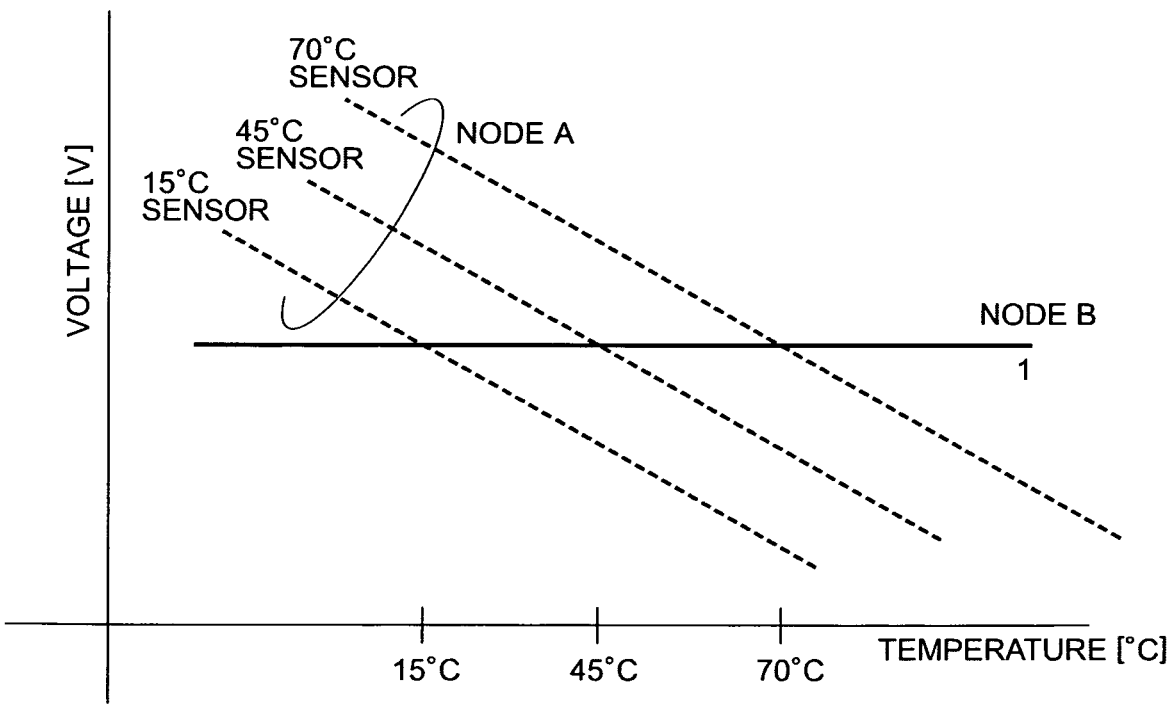
FIG. 8 is a diagram showing a relationship between temperatures and potentials at nodes A and B shown in FIG. 6.

FIG. 5 is a circuit diagram of a bandgap reference circuit in a temperature sensor showing a second embodiment of the present invention. Constituent elements common to those shown in FIG. 2 showing the bandgap reference circuit 30 of the first embodiment are given common reference numerals respectively.

In the bandgap reference circuit of the second embodiment 2, an adjustment circuit 35 comprising PMOSs 35a, 35b, 35c and 35d is inserted into the drain sides of the current mirror driver PMOSs 31a, 31c, 32a and 33a in FIG. 2 showing the first embodiment. In the respective PMOSs 35a through 35d, their gate potentials are controlled by a bias potential BIAS dependent on a source potential VDD. The second embodiment is similar to the first embodiment in other configuration.

According to the second embodiment, since the adjustment circuit 35 is provided, the gate potentials of the respective PMOSs 35a through 35d are controlled by the bias potential BIAS dependent on the source potential VDD, so that drain-to-source potentials Vds of the respective current mirror driver PMOSs 31a through 33a are aligned with one another. Thus, it is possible to suppress a variation in drain-to-source potential Vds of each current mirror driver due to a load change that causes a reduction in current mirroring accuracy and enhance resistance to dependency on the source potential VDD and the load change.

Incidentally, the present invention is not limited to the first and second embodiments. Various modifications and usage forms can be made. As the modifications and the usage forms, there are provided, for example, such ones (a) and (b) shown below.

(a) The bandgap reference circuit 30, the subtraction amplifier circuit 40 and the A/D converter 50 may respectively be changed to circuit configurations other than the ones illustrated in the figures.

(b) The subtraction amplifier circuit 40 in FIG. 1 may be substituted with various function generators. Thus, a temperature sensor having a temperature determining function based on arbitrary functions can be realized by outputting potentials of functions each having a temperature characteristic, which are different from the temperature-dependent potential Vtg, from the substituted function generators and converting the same into digital signals by the A/D converter 50.

What is claimed is:

1. A temperature sensor comprising:
    a bandgap reference circuit that generates a reference potential using PN-junction diode characteristics and generates a first temperature-dependent potential dependent on the temperature;
    a subtraction amplifier circuit that inputs the reference potential and the first temperature-dependent potential therein and generates a second temperature-dependent potential amplified by subtraction amplification of both a constant bias potential obtained by performing multiplication on the reference potential and the first temperature-dependent potential; and
    an analog/digital converter that inputs the reference potential and the second temperature-dependent potential therein and the analog/digital converter converts the second temperature-dependent potential by reference to the reference potential to thereby output temperature decision results.

2. The temperature sensor according to claim 1, wherein the bandgap reference circuit comprises:
    a temperature-dependent potential detection section that detects a first potential dependent on the temperature using the PN-junction diode characteristics;
    a bandgap reference section that generates a second potential corresponding to a reference potential using the PN-junction diode characteristics on the basis of the first potential detected by the temperature-dependent potential detection section;
    a temperature-dependent potential output section that generates the first temperature-dependent potential, based on the first potential detected by the temperature-dependent potential detection section and outputs the same therefrom; and
    a trimming voltage follower section that adjusts the second potential in accordance with a trimming signal and adjusts the second potential to a predetermined level thereby to generate the reference potential.

3. The temperature sensor according to claim 2, wherein the temperature-dependent potential detection section, the bandgap reference section and the temperature-dependent potential output section are configured in such a manner that source currents proportional to one another flow by a current minor circuit.

4. The temperature sensor according to claim 3, further comprising an adjustment circuit for adjusting potentials of the current minor circuit by a constant potential.

* * * * *